United States Patent
Sasaki

(10) Patent No.: US 12,043,068 B2
(45) Date of Patent: Jul. 23, 2024

(54) AIR PRESSURE ABNORMALITY DETERMINATION SYSTEM AND AIR PRESSURE ABNORMALITY DETERMINATION METHOD

(71) Applicant: TOYOTA JIDOSHA KABUSHIKI KAISHA, Toyota (JP)

(72) Inventor: Katsuya Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 17/986,053

(22) Filed: Nov. 14, 2022

(65) Prior Publication Data
US 2023/0166569 A1    Jun. 1, 2023

(30) Foreign Application Priority Data
Dec. 1, 2021 (JP) ................. 2021-195208

(51) Int. Cl.
*B60C 23/04* (2006.01)
*B60C 23/00* (2006.01)
*G01L 17/00* (2006.01)
*G01P 3/44* (2006.01)

(52) U.S. Cl.
CPC ........ *B60C 23/0488* (2013.01); *B60C 23/002* (2013.01); *B60C 23/0416* (2013.01); *G01L 17/00* (2013.01); *G01P 3/44* (2013.01)

(58) Field of Classification Search
CPC ................................... B60C 23/0488
USPC ........................................... 73/146.2
See application file for complete search history.

(56) References Cited

U.S. PATENT DOCUMENTS

| | | | | |
|---|---|---|---|---|
| 5,826,210 A | * | 10/1998 | Izumi | B60C 23/061 702/140 |
| 2010/0191495 A1 | * | 7/2010 | Drevo | G01L 27/00 702/98 |

FOREIGN PATENT DOCUMENTS

JP        06-320923 A       11/1994

* cited by examiner

*Primary Examiner* — Walter L Lindsay, Jr.
*Assistant Examiner* — Philip T Fadul
(74) *Attorney, Agent, or Firm* — Dinsmore & Shohl LLP

(57) ABSTRACT

An air pressure abnormality determination system determines whether an air pressure abnormality in which an air pressure of at least one of multiple front tires and multiple rear tires drops. The front tires are front wheels of a vehicle. The rear tires are rear wheels of the vehicle and of which outer diameter is different from an outer diameter of the front tires. A determination is made on whether the air pressure abnormality occurs using a corrected wheel speed obtained by correcting one of a front wheel speed that is a wheel speed of the front wheels and a rear wheel speed that is a wheel speed of the rear wheels based on the outer diameter of the front tires and the outer diameter of the rear tires and an uncorrected wheel speed that is the other of the front wheel speed and the rear wheel speed that is uncorrected.

6 Claims, 2 Drawing Sheets

AIR PRESSURE ABNORMALITY DETERMINATION SYSTEM AND AIR PRESSURE ABNORMALITY DETERMINATION METHOD

CROSS-REFERENCE TO RELATED APPLICATION

This application claims priority to Japanese Patent Application No. 2021-195208 filed on Dec. 1, 2021, incorporated herein by reference in its entirety.

BACKGROUND

1. Technical Field

The present disclosure relates to an air pressure abnormality determination system and an air pressure abnormality determination method, and more specifically, the air pressure abnormality determination system and the air pressure abnormality determination method that determine whether an air pressure abnormality in which an air pressure of at least one of multiple front tires that are front wheels of a vehicle and multiple rear tires that are rear wheels of the vehicle and have an outer diameter different from that of the front tires.

2. Description of Related Art

In the related art, as this type of the air pressure abnormality determination system, there has been proposed a system for determining an air pressure abnormality in which the air pressure of multiple tires that are multiple wheels of a vehicle drops (for example, see Japanese Unexamined Patent Application Publication No. 6-320923 (JP 6-320923 A)). This device determines whether the tire air pressure drops based on wheel speeds of the tires or a wheel speed difference between the tires.

SUMMARY

However, the air pressure abnormality determination system described above may not be able to accurately determine whether the tire air pressure drops. For example, when front and rear tires with different outer diameters are used, a difference between the front and rear wheel speeds occurs even when the tire air pressure is normal. Therefore, when a determination is made on whether the tire air pressure drops based on the wheel speeds of the tires or the wheel speed difference between the tires, whether the tire air pressure drops cannot be determined.

It is a main object of the air pressure abnormality determination system and air pressure abnormality determination method according to the present disclosure to accurately determine whether the tire air pressure drops when the outer diameter of the front tires is different from the outer diameter of the rear tires.

The air pressure abnormality determination system and the air pressure abnormality determination method according to the present disclosure employ the following means in order to achieve the main object described above.

An air pressure abnormality determination system according to the present disclosure is an air pressure abnormality determination system that determines whether an air pressure abnormality in which an air pressure of at least one of multiple front tires and multiple rear tires drops, the front tires being front wheels of a vehicle and the rear tires being rear wheels of the vehicle and of which outer diameter is different from an outer diameter of the front tires. The gist of the air pressure abnormality system is that a determination is made on whether the air pressure abnormality occurs using a corrected wheel speed obtained by correcting one of a front wheel speed that is a wheel speed of the front wheels and a rear wheel speed that is a wheel speed of the rear wheels based on the outer diameter of the front tires and the outer diameter of the rear tires and an uncorrected wheel speed that is the other of the front wheel speed and the rear wheel speed that is uncorrected.

In the air pressure abnormality determination system according to the present disclosure, a determination is made on whether the air pressure abnormality occurs using the corrected wheel speed obtained by correcting one of the front wheel speed that is a wheel speed of the front wheels and the rear wheel speed that is a wheel speed of the rear wheels based on the outer diameter of the front tires and the outer diameter of the rear tires and the uncorrected wheel speed that is the other of the front wheel speed and the rear wheel speed that is uncorrected. As a result, when the outer diameter of the front tire is different from the outer diameter of the rear tire, whether the air pressure of the tire drops can be accurately determined.

In the air pressure abnormality determination system according to the present disclosure, the corrected wheel speed may be a wheel speed in which the rear wheel speed is corrected by multiplying the rear wheel speed by a ratio of the outer diameter of the front tires to the outer diameter of the rear tires or a wheel speed in which the front wheel speed is corrected by multiplying the front wheel speed by a ratio of the outer diameter of the rear tires to the outer diameter of the front tires. With the above, whether the air pressure abnormality occurs can be determined using the corrected wheel speed that is more appropriate.

Further, in the air pressure abnormality determination system according to the present disclosure, the determination may be made that the air pressure abnormality occurs when at least one of a ratio of a first wheel speed difference obtained by subtracting a vehicle body speed from the corrected wheel speed or the corrected wheel speed to the vehicle body speed and a ratio of a second wheel speed obtained by subtracting the vehicle body speed from the uncorrected wheel speed or the uncorrected wheel speed to the vehicle body speed is less than a predetermined ratio. With the above, the air pressure abnormality, that is, whether the air pressure of the tire drops, can be accurately determined. Here, as the "vehicle body speed", the average value of the corrected wheel speed and the uncorrected wheel speed may be used, the vehicle speed from a vehicle speed sensor that detects the vehicle speed may be used, or the vehicle speed calculated from the rotation speed of the rotation shaft of the transmission may be used when the transmission is installed in the vehicle.

Further, in the air pressure abnormality determination system according to the present disclosure, a determination may be made on whether the air pressure abnormality occurs when a linear continuous distance from a current location in a traveling direction is a predetermined distance or longer on a scheduled traveling road on which the vehicle is scheduled to travel. When a determination is made on whether the air pressure abnormality occurs in the case where the linear continuous distance from the current location in the traveling direction is less than the predetermined distance, the vehicle may pass through a curve before the determination is completed. The vehicle inclines in the right-left direction when the vehicle passes through the curve. Therefore, the front wheel speed and the rear wheel speed cannot be accurately obtained. Therefore, there may be a case where whether the air pressure abnormality occurs cannot be accurately determined. However, sufficient determination time can be secured by determining whether the air pressure abnormality occurs when the linear continuous distance from the current location in the traveling direction is the predetermined distance or more. With the above, whether the air pressure of the tire drops can be determined more accurately. Here, the "predetermined distance" is a distance determined as a traveling distance corresponding to the time required to measure the wheel speed. When the air pressure abnormality determination system is provided with a vehicle speed sensor that detects the vehicle speed, the predetermined distance may be a distance obtained by multiplying the vehicle speed from the vehicle speed sensor by the time required for measuring the wheel speed.

Then, in the air pressure abnormality determination system according to the present disclosure, in a case where a linear continuous distance from a current location in a traveling direction is a predetermined distance or longer on a scheduled traveling road on which the vehicle is scheduled to travel, a determination is made on whether the air pressure abnormality occurs when a road within a traveling section from the current location to the predetermined distance is a paved road. A vibration is large in an unpaved section where the road is unpaved. Therefore, the front wheel speed and the rear wheel speed cannot be acquired, which may result in an inability to determine whether the air pressure abnormality occurs accurately. Accordingly, when the road within the traveling section from the current location to the predetermined distance is a paved road in a case where the linear continuous distance from the current location in the traveling direction is the predetermine distance or longer, the front wheel speed and the rear wheel speed can be accurately acquired by determining whether the air pressure abnormality occurs. With the above, whether the air pressure of the tire drops can be determined more accurately.

Further, the air pressure abnormality determination system according to the present disclosure may further include a first wheel speed sensor that is an electromagnetic pickup type wheel speed sensor for detecting the front wheel speed and a second wheel speed sensor that is an electromagnetic pickup type wheel speed sensor for detecting the rear wheel speed.

An air pressure abnormality determination method according to the present disclosure is an air pressure abnormality determination method for determining whether an air pressure abnormality in which an air pressure of at least one of multiple front tires and multiple rear tires drops, the front tires being front wheels of a vehicle and the rear tires being rear wheels of the vehicle and of which outer diameter is different from an outer diameter of the front tires. The gist of the air pressure abnormality method is that the air pressure abnormality is determined using a corrected wheel speed obtained by correcting one of a front wheel speed that is a wheel speed of the front wheels and a rear wheel speed that is a wheel speed of the rear wheels based on the outer diameter of the front tires and the outer diameter of the rear tires and an uncorrected wheel speed that is the other of the front wheel speed and the rear wheel speed that is uncorrected.

In the air pressure abnormality determination method according to the present disclosure, a determination is made on whether the air pressure abnormality occurs using the corrected wheel speed obtained by correcting one of the front wheel speed that is a wheel speed of the front wheels and the rear wheel speed that is a wheel speed of the rear wheels based on the outer diameter of the front tires and the outer diameter of the rear tires and the uncorrected wheel speed that is the other of the front wheel speed and the rear wheel speed that is uncorrected. As a result, when the outer diameter of the front tires is different from the outer diameter of the rear tires, whether the air pressure of the tire drops can be accurately determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to an embodiment.

Figure 1:
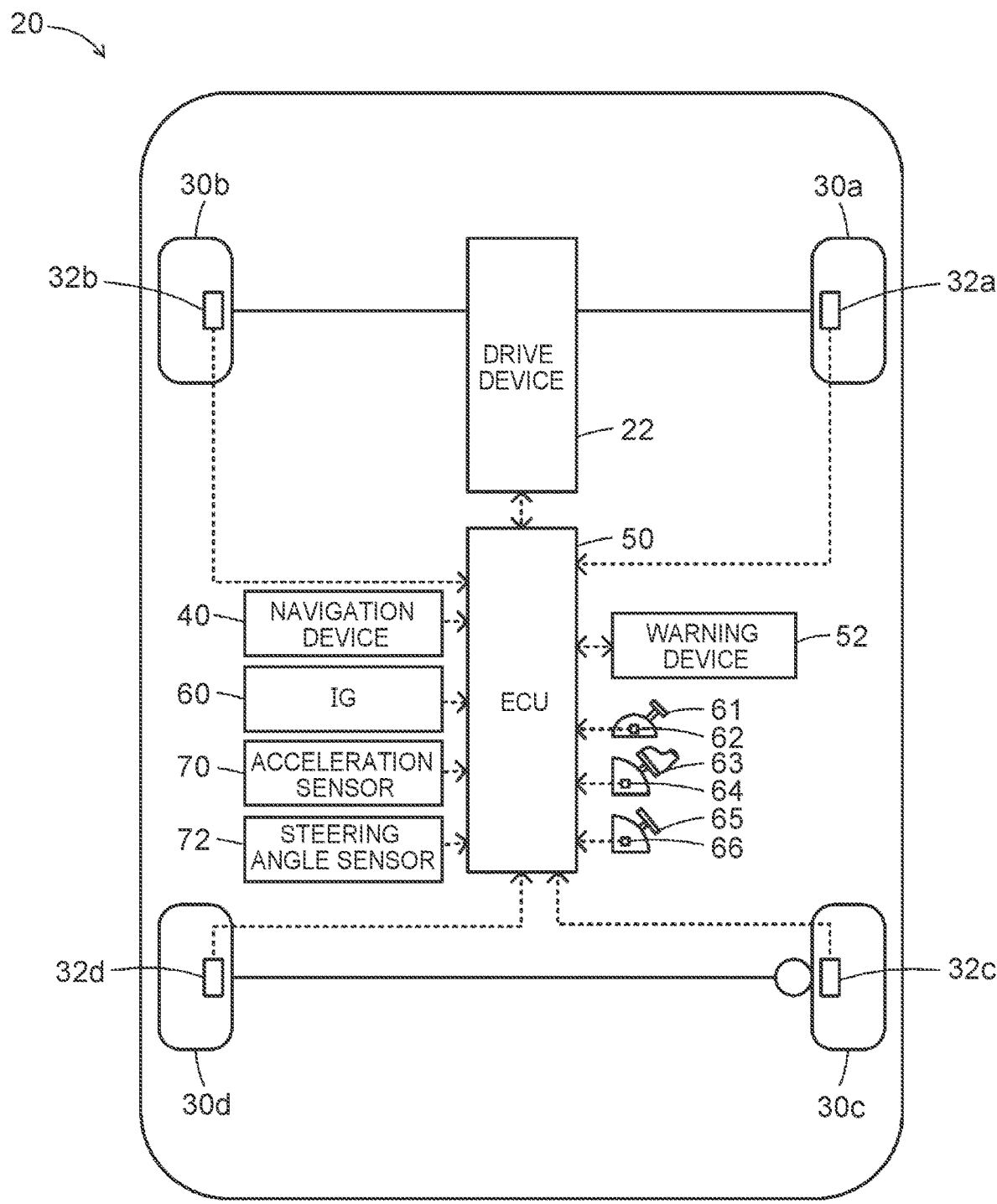
FIG. 1 is a configuration diagram showing an outline of a configuration of a vehicle 20 including an air pressure abnormality determination system as an embodiment of the present disclosure.

FIG. 1 is a configuration diagram showing an outline of a configuration of a vehicle 20 including an air pressure abnormality determination system as an embodiment of the present disclosure. The vehicle 20 includes a drive device 22, a navigation device 40, and an electronic control unit (hereinafter referred to as "ECU") 50, as shown in the drawing.

The drive device 22 includes, for example, a power source such as a motor or an engine, a transmission, and the like, and is configured as a device that drives front tires 30a, 30b that are front wheels and rear tires 30c, 30d that are rear wheels using power from the power source. The front tires 30a, 30b are provided as tires having an outer diameter Rf at a predetermined air pressure Pa that is predetermined as an air pressure while the vehicle 20 is traveling. As the rear tires 30c, 30d, tires having an outer diameter Rr that is larger than the outer diameter Rf at the predetermined air pressure Pa are used. As the rear tires 30c, 30d, tires having the outer diameter Rr smaller than the outer diameter Rf at the predetermined air pressure Pa may be used. The drive device 22 is controlled by the ECU 50.

When the destination is set by an operation of a user, the navigation device 40 is configured as a known navigation device that sets a scheduled traveling route (scheduled traveling road) from the current location to the destination of a host vehicle based on the stored map information, the current location of the host vehicle from a global positioning system (GPS) antenna (not shown), and the set destination, and provides a route guidance while displaying the set scheduled traveling route on a display that is not shown. The map information includes service information (for example, sightseeing information, parking lots, etc.) and road information for each traveling section (for example, a section between traffic lights, a section between intersections, etc.). The road information includes distance information, pavement information (paved or unpaved), width information, information on the number of lanes, area information (urban and suburban areas), type information (general roads and expressways), gradient information, the legal speed, the number of traffic lights, the turning radius of each curve, etc. The navigation device 40 exchanges various data with the ECU 50.

Although not shown, the ECU 50 is configured as a microprocessor centering on a CPU, and in addition to the CPU, includes a read-only memory (ROM) for storing processing programs, a random access memory (RAM) for temporarily storing data, an input/output port, and a communication port.

Signals from various sensors are input to the ECU 50. As the signals input to the ECU 50, front wheel speeds Vfr, Vfl from wheel speed sensors 32a, 32b that detect the wheel speeds of the front tires 30a, 30b, and rear wheel speeds Vrr, Vrl from wheel speed sensors 32c, 32d that detect the wheel speeds of the rear tires 30c, 30d, the road information on the scheduled traveling route from the navigation device 40, and the like can be exemplified. The wheel speed sensor 32a is configured as an electromagnetic pickup type sensor that is attached to an axle to which the front tire 30a is connected and reads irregularities of a pulse gear provided with a plurality of external teeth. The wheel speed sensor 32a detects a calculated vehicle speed as the front wheel speed Vfr from the number of irregularities of the pulse gear read per unit time, that is, the rotation speed calculated by measuring the number of teeth. The wheel speed sensors 32b to 32d are configured as electromagnetic pickup type sensors similar to the wheel speed sensor 32a, and detect the front wheel speed Vfl and the rear wheel speeds Vrr, Vrl. As the signals input to the ECU 50, an ignition signal from an ignition switch 60 and a shift position SP from a shift position sensor 62 that detects the operating position of a shift lever 61 can be exemplified. An accelerator operation amount Acc from an accelerator pedal position sensor 64 that detects the amount of depression of an accelerator pedal 63 and a brake pedal position BP from a brake pedal position sensor 66 that detects the amount of depression of a brake pedal 65 can also be exemplified. Further, a longitudinal acceleration α from an acceleration sensor 70 that detects acceleration in the longitudinal direction and a steering angle θ from a steering angle sensor 72 that detects a steering angle of a steering (not shown) (with the steering angle neutral point set to 0°) can also be exemplified.

Various control signals are output from the ECU 50 through an output port. As the signals output from the ECU 50, for example, a control signal for controlling the drive device 22 and a warning signal to a warning device 52 can be exemplified. The ECU 50 executes various calculations for causing the vehicle 30 to travel.

Figure 2:
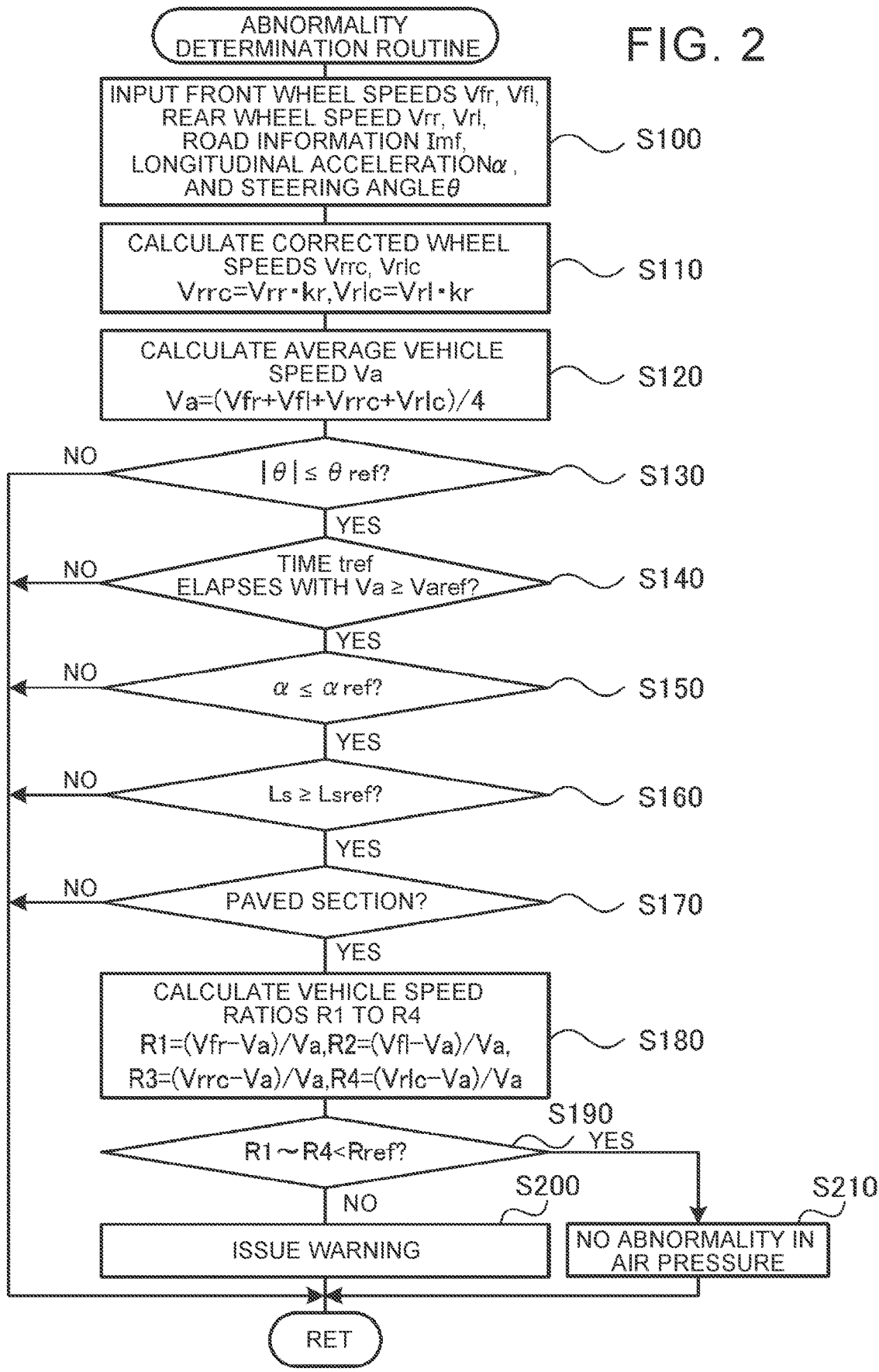
FIG. 2 is a flowchart showing an example of an abnormality determination routine executed by an electronic control unit (ECU) 50.

Next, the operation of the vehicle 20 configured as described above, in particular, an operation of determining whether an air pressure abnormality of the tires in which the air pressure of the front tires 30a, 30b and the rear tires 30c, 30d drops occurs will be described. FIG. 2 is a flowchart showing an example of an abnormality determination routine executed by the ECU 50. The routine is repeatedly executed every predetermined time (for example, every several milliseconds).

When this routine is executed, the CPU of the ECU 50 executes processing for inputting the front wheel speeds Vfr, Vfl, the rear wheel speeds Vrr, Vrl, road information Imf, longitudinal acceleration α, and steering angle θ (step S100). The values detected by the wheel speed sensors 32a to 32d are input as the front wheel speeds Vfr, Vfl and the rear wheel speeds Vrr, Vrl. The road information of the scheduled traveling route set by the navigation device 40 is input as the road information Imf. A value detected by the acceleration sensor 70 is input as the longitudinal acceleration α. A value detected by the steering angle sensor 72 is input as the steering angle θ.

When the data are input as described above, corrected wheel speeds Vrrc (=Vrr·kr) and Vrlc (=Vrl·kr) are calculated using the rear wheel speeds Vrr, Vrl multiplied by a ratio kr (step S110), and an average vehicle speed Va is calculated based on the equation (1) below using the front wheel speeds Vfr, Vfl and the corrected wheel speeds Vrrc, Vrlc (step S120). In step S110, the ratio kr is the ratio (=Rf/Rr) of the outer diameter Rf of the front tires 30a, 30b to the outer diameter Rr of the rear tires 30c, 30d. Therefore, the corrected wheel speeds Vrrc, Vrlc are values obtained by converting the rear wheel speeds Vrr, Vrl into wheel speeds when the rear tires 30c, 30d have the same outer diameter Rf as the front tires 30a, 30b.

$$Va=(Vfr+Vfl+Vrrc+Vrlc)/4 \qquad (1)$$

Next, whether a determination is made on whether an absolute value |θ| of the steering angle θ is a threshold value θref or less (step S130), a determination is made on whether a state in which the average vehicle speed Va is a threshold value Varef or larger continues for a predetermined time tref or longer (step S140), a determination is made on whether the longitudinal acceleration α is a threshold value αref or less (step S150), a determination is made on whether a linear continuous distance Ls from the current location in a traveling distance is a threshold value (predetermined distance) Lsref or longer (step S160), and a determination is made on whether a traveling section from the current location to the distance Lsref (the same value as the threshold value Lsref) is a paved section (section S170). The determinations in steps S160 and S170 are made based on the road information Imf input in step S100.

The wheel speed sensors 32a to 32d cannot accurately measure the wheel speeds (the front wheel speeds Vfr, Vfl, the rear wheel speeds Vrr, Vrl) when the steering angle θ becomes larger to exceed a steering play range. Further, when the average vehicle speed Va is low, the wheel speed sensors 32a to 32d cannot accurately measure the wheel speed because the number of irregularities of the pulse gear read per unit time is small. Furthermore, the wheel speed sensors 32a to 32d cannot accurately measure the wheel speed because the measurement time of the wheel speed becomes short when the linear continuous distance Ls in the traveling direction is short. In steps S130 to S160, in consideration of the measurement accuracy of the wheel speeds as described above, the threshold values θref, Varef, αref, and Lsref are set as an upper limit value of the absolute value |θ| of the steering angle θ at which the wheel speed can be accurately measured (for example, the upper limit value of the absolute value |θ| of the steering angle θ corresponding to a steering play), a lower limit value of the average vehicle speed Va at which the vehicle speed can be accurately measured, an upper limit value of the longitudinal acceleration α at which the wheel speed can be accurately measured, and a lower limit value of the linear continuous distance Ls in the traveling direction at which the wheel speed can be accurately measured. Further, since the wheel speed sensors 32a to 32d vibrate greatly in an unpaved section and cannot accurately measure the wheel speed, the process in step S170 is a process of determining whether the wheel speed can be accurately measured. When the wheel speed sensors 32a to 32d cannot accurately measure the wheel speed, an air pressure abnormality determination in steps S180 to S210 (to be described later) cannot be executed accurately. Therefore, the processes in steps S130 to S170 are processes of determining whether the air pressure abnormality determination in steps S180 to S210 can be accurately executed.

When at least one of the steps S130 to S170 is not satisfied, that is, when the absolute value |θ| of the steering angle θ is larger than the threshold value θref in step S130, when the average vehicle speed Va is less than the threshold value Varef or the average vehicle speed Va is the threshold value Varef or larger and the predetermined time tref has not elapsed in step S140, when the longitudinal acceleration α exceeds the threshold value αref in step S150, when the continuous distance LS is less than the threshold value Lsref in step S160, or when an unpaved section is included in the traveling section from the current location to the distance Lsref (the same value as the threshold value Lsref) in step S170, the air pressure abnormality determination cannot be accurately executed. Therefore, a determination is made that the air pressure abnormality determination should not be executed and this routine ends.

When all of the steps S130 to S170 are satisfied, that is, when the absolute value |θ| of the steering angle θ is the threshold value θref or less in step S130, when the average vehicle speed Va is the threshold value Varef or larger and the predetermined time tref has elapsed in step S140, when the longitudinal acceleration α is the threshold value αref or less in step S150, when the continuous distance LS is the threshold value Lsref or larger in step S160, and when the traveling section from the current location to the distance Lsref (the same value as the threshold value Lsref) is the paved section in step S170, a determination is made that the air pressure abnormality determination can be accurately executed. Therefore, the air pressure abnormality determination in steps S180 to S210 is executed and this routine ends.

In the air pressure abnormality determination, first, vehicle speed ratios R1 to R4 indicating degrees of deviation of uncorrected front wheel speeds (uncorrected wheel speeds) Vfr, Vfl and the corrected wheel speeds Vrrc, Vrlc from the average vehicle speed Va are calculated based on the equations (2) to (5) below using the uncorrected front wheel speeds Vfr, Vfl, the corrected wheel speeds Vrrc, Vrlc, and the average vehicle speed Va (step S180), and a determination is made on whether all of the vehicle speed ratios R1 to R4 are less than a threshold value Rref (step S190). The threshold value Rref is a threshold value for determining whether the front wheel speeds Vfr, Vfl and the corrected wheel speeds Vrrc, Vrlc deviate significantly from the average vehicle speed Va. Therefore, step S190 is a process of determining whether at least one of the front wheel speeds Vfr, Vfl and the corrected wheel speeds Vrrc, Vrlc deviates significantly from the average vehicle speed Va. The reason why the vehicle speed ratios R3, R4 are calculated using the corrected wheel speeds Vrrc, Vrlc instead of the rear wheel speeds Vrr, Vrl is as follows.

$$R1=(Vfr-Va)/Va \quad (2)$$

$$R2=(Vfl-Va)/Va \quad (3)$$

$$R3=(Vrrc-Va)/Va \quad (4)$$

$$R4=(Vrlc-Va)/Va \quad (5)$$

When the outer diameter Rr of the front tires 30a, 30b and the outer diameter Rf of the rear tires 30c, 30d are equal to each other, and the air pressures of the four tires are appropriate, the front wheel speeds Vfr, Vfl and the rear wheel speeds Vrr, Vrl are equal to each other. Therefore, when the air pressure of one of the four tires drops, the wheel speed of the tire of which air pressure drops significantly increases, whereby an air pressure drop of the tire can be easily determined.

In the case where the outer diameter Rr of the front tires 30a, 30b and the outer diameter Rf of the rear tires 30c, 30d are different from each other, even when the air pressures of the four tires are appropriate, a difference occurs between the front wheel speeds Vfr, Vfl and the rear wheel speeds Vrr, Vrl. Therefore, it is difficult to accurately determine the air pressure drop of at least one of the four tires based on the front wheel speeds Vfr, Vfl and the rear wheel speeds Vrr, Vrl. In the embodiment, the vehicle speed ratios R3, R4 are calculated using the corrected wheel speeds Vrrc, Vrlc corrected by multiplying the rear wheel speeds Vrr, Vrl by the ratio kr of the outer diameter Rf to the outer diameter Rr, that is, the corrected wheel speeds Vrrc, Vrlc obtained by converting the rear wheel speeds Vrr, Vrl into wheel speeds when the rear tires 30c, 30d and the front tires 30a, 30b have the same outer diameter Rf, instead of the rear wheel speeds Vrr, Vrl. When the air pressures of the four tires are appropriate, the vehicle speed ratios R1 to R4 are less than the threshold value Rref, and when the air pressure of at least one of the four tires drops, the vehicle speed ratio of the tire of which air pressure drops among the vehicle speed ratios R1 to R4 is the threshold value Rref or larger, whereby the air pressure drop of the tire can be determined. On the basis of the reason above, the vehicle speed ratios R3, R4 are calculated using the corrected wheel speeds Vrrc, Vrlc instead of the rear wheel speeds Vrr, Vrl.

When at least one of the vehicle speed ratios R1 to R4 is the threshold value Rref or higher in step S190, the warning device 52 is controlled so as to issue a warning indicating that the air pressure of any of the front tires 30a, 30b and the rear tires 30c, 30d is low (step S200), and when all of the vehicle speed ratios R1 to R4 are less than the threshold value Rref, a determination is made that there is no air pressure abnormality (step S210), and this routine ends. As described above, by executing the air pressure abnormality determination using the vehicle speed ratios R1 to R4 calculated using the uncorrected front wheel speeds Vfr, Vfl and the corrected wheel speeds Vrrc, Vrlc, whether the air pressure of the tire drops can be accurately determined when the outer diameter Rf of the front tires 30a, 30b and the outer diameter Rr of the rear tires 30c, 30d are different from each other.

According to the vehicle 20 provided with the air pressure abnormality determination system of the embodiment described above, a determination is made on whether the air pressure abnormality occurs using the corrected wheel speeds Vrrc, Vrlc obtained by correcting the rear wheel speeds Vrr, Vrl based on the outer diameter Rf of the front tires 30a, 30b and the outer diameter Rr of the rear tires 30c, 30d and the uncorrected front wheel speeds Vfr, Vfl, whereby whether the air pressure of the tire drops can be accurately determined in the case where the outer diameter Rf of the front tires 30a, 30b and the outer diameter Rr of the rear tires 30c, 30d are different from each other.

The corrected wheel speeds Vrrc, Vrlc are wheel speeds in which the rear wheel speeds Vrr, Vrl are corrected by multiplying the rear wheel speeds Vrr, Vrl by the ratio kr of the outer diameter Rf of the front tires 30a, 30b to the outer diameter Rr of the rear tires 30c, 30d, whereby whether the air pressure of the tire drops can be accurately determined using the corrected wheel speeds Vrrc, Vrlc that are more appropriate.

Furthermore, a determination is made that the air pressure abnormality occurs when any one of the vehicle speed ratios R3, R4 as the ratios of the wheel speed differences obtained by subtracting the average vehicle speed Va from the corrected wheel speeds Vrrc, Vrlc to the average vehicle speed Va and the vehicle speed ratios R1, R2 as the ratios of the wheel speed differences obtained by subtracting the average vehicle speed Va from the front wheel speeds Vfr, Vfl to the average vehicle speed Va is less than a predetermined ratio, whereby whether the air pressure of the tire drops can be accurately determined in the case where the outer diameter Rf of the front tires 30a, 30b and the outer diameter Rr of the rear tires 30c, 30d are different from each other.

Then, when the absolute value |θ| of the steering angle θ is the threshold value θref or less in step S130, when the average vehicle speed Va is the threshold value Varef or larger and the predetermined time tref has elapsed in step S140, when the longitudinal acceleration α is the threshold value αref or less in step S150, when the continuous distance Ls is the threshold value Lsref or larger in step S160, and when the traveling section from the current location to the distance Lsref (the same value as the threshold value Lsref) is the paved section in step S170, the air pressure abnormality determination can be accurately executed by executing the air pressure abnormality determination.

In the vehicle 20 provided with the air pressure abnormality determination system according to the embodiment, a determination is made on whether the air pressure abnormality occurs using the corrected wheel speeds Vrrc, Vrlc obtained by multiplying the rear wheel speeds Vrr, Vrl by the ratio kr (=Rf/Rr) of the outer diameter Rf of the front tires 30a, 30b to the outer diameter Rr of the rear tires 30c, 30d and the uncorrected front wheel speeds Vfr, Vfl. However, whether the air pressure abnormality occurs may be determined using the corrected wheel speeds Vfrc, Vflc obtained by multiplying the front wheel speeds Vfr, Vfl by the ratio kr (=Rr/Rf) of the outer diameter Rr of the rear tires 30c, 30d to the outer diameter Rf of the front tires 30a, 30b, and the uncorrected rear wheel speeds Vrr, Vrl.

In the vehicle 20 provided with the air pressure abnormality determination system according to the embodiment, the vehicle speed ratios R3, R4 are calculated as the ratios of wheel speed differences obtained by subtracting the average vehicle speed Va from the corrected wheel speeds Vrrc, Vrlc to the average vehicle speed Va, and the vehicle speed ratios R1, R2 are calculated as the ratios of wheel speed differences obtained by subtracting the average vehicle speed Va from the front wheel speeds Vfr, Vfl to the average vehicle speed Va. However, the vehicle speed ratios R1 to R4 may be calculated using a vehicle body speed as a speed of the vehicle body of the vehicle 20. When the vehicle 20 includes a vehicle speed sensor that detects the vehicle speed, the vehicle speed ratios R1 to R4 may be calculated using a vehicle speed V from the vehicle speed sensor instead of the average vehicle speed Va. Further, when the drive device 22 is provided with a transmission and the vehicle speed can be calculated from the rotational speed of the rotary shaft of the transmission, the calculated vehicle speed may be used instead of the average vehicle speed Va. Alternatively, the vehicle speed ratios R3, R4 may be calculated as the ratios of the corrected wheel speeds Vrrc, Vrlc to the average vehicle speed Va, and the vehicle speed ratios R1, R2 may be calculated as the ratios of the front wheel speeds Vfr, Vfl to the average vehicle speed Va. Also in this case, the vehicle speed ratios R1 to R4 may be calculated using the vehicle speed V from the vehicle speed sensor, instead of the average vehicle speed Va, or the vehicle speed ratios R1 to R4 may be calculated using the vehicle speed calculated from the rotation speed of the rotation shaft of the transmission, instead of the average vehicle speed Va.

In the vehicle 20 provided with the air pressure abnormality determination system according to the embodiment, the air pressure abnormality determination is executed when all of steps S130 to S170 are satisfied. However, the air pressure abnormality determination may be executed based on a determination that the air pressure abnormality determination can be accurately executed when at least one of the determinations in steps S130 to S170 is executed and the executed determination is satisfied. Steps S180 to S210 may be executed after step S120 without executing steps S130 to S170.

In the embodiment, the case where the air pressure abnormality determination system according to the present disclosure is installed in the vehicle 20 is illustrated. However, a part or the entire of the air pressure abnormality determination system according to the present disclosure may be installed in a server capable of exchanging data with the vehicle 20.

In the embodiment, the present disclosure is exemplified as a mode of the air pressure abnormality determination system. However, according to the present disclosure, a mode of an air pressure abnormality determination method for determining whether the air pressure abnormality occurs using the corrected wheel speeds Vrrc, Vrlc obtained by correcting the rear wheel speeds Vrr, Vrl based on the outer diameter Rf of the front tires 30a, 30b and the outer diameter Rr of the rear tires 30c, 30d and the uncorrected front wheel speeds Vfr, Vfl may be adopted.

The correspondence between the main elements of the embodiment and the main elements of the disclosure described in SUMMARY will be described. In the embodiment, the ECU 50 corresponds to an "air pressure abnormality determination system". Further, the abnormality determination routine executed by the ECU 50 (illustrated in FIG. 2) corresponds to an "air pressure abnormality determination method".

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although a mode for carrying out the present disclosure has been described above with reference to the embodiment, the present disclosure is not limited to the embodiment, and it goes without saying that the present disclosure can be carried out in various modes without departing from the gist of the present disclosure.

The present disclosure can be used in the manufacturing industry of an air pressure abnormality determination system and the like.

What is claimed is:

1. An air pressure abnormality determination system that determines whether an air pressure abnormality in which an air pressure of at least one of multiple front tires and multiple rear tires drops, the front tires being front wheels of a vehicle and the rear tires being rear wheels of the vehicle and of which outer diameter is different from an outer diameter of the front tires, wherein a determination is made on whether the air pressure abnormality occurs using a corrected wheel speed obtained by correcting one of a front wheel speed that is a wheel speed of the front wheels and a rear wheel speed that is a wheel speed of the rear wheels based on the outer diameter of the front tires and the outer diameter of the rear tires and an uncorrected wheel speed that is the other of the front wheel speed and the rear wheel speed that is uncorrected.

2. The air pressure abnormality determination system according to claim 1, wherein the corrected wheel speed is a wheel speed in which the rear wheel speed is corrected by multiplying the rear wheel speed by a ratio of the outer diameter of the front tires to the outer diameter of the rear tires or a wheel speed in which the front wheel speed is corrected by multiplying the front wheel speed by a ratio of the outer diameter of the rear tires to the outer diameter of the front tires.

3. The air pressure abnormality determination system according to claim 1, wherein the determination is made that the air pressure abnormality occurs when at least one of a ratio of a first wheel speed difference obtained by subtracting a vehicle body speed from the corrected wheel speed or the corrected wheel speed to the vehicle body speed and a ratio of a second wheel speed obtained by subtracting the vehicle body speed from the uncorrected wheel speed or the uncorrected wheel speed to the vehicle body speed is less than a predetermined ratio.

4. The air pressure abnormality determination system according to claim 1, wherein a determination is made on whether the air pressure abnormality occurs when a linear continuous distance from a current location in a traveling direction is a predetermined distance or longer on a scheduled traveling road on which the vehicle is scheduled to travel.

5. The air pressure abnormality determination system according to claim 1, wherein in a case where a linear continuous distance from a current location in a traveling direction is a predetermined distance or longer on a scheduled traveling road on which the vehicle is scheduled to travel, a determination is made on whether the air pressure abnormality occurs when a road within a traveling section from the current location to the predetermined distance is a paved road.

6. An air pressure abnormality determination method for determining whether an air pressure abnormality in which an air pressure of at least one of multiple front tires and multiple rear tires drops, the front tires being front wheels of a vehicle and the rear tires being are rear wheels of the vehicle and of which outer diameter is different from an outer diameter of the front tires, wherein a determination is made on whether the air pressure abnormality occurs using a corrected wheel speed obtained by correcting one of a front wheel speed that is a wheel speed of the front wheels and a rear wheel speed that is a wheel speed of the rear wheels based on the outer diameter of the front tires and the outer diameter of the rear tires and an uncorrected wheel speed that is the other of the front wheel speed and the rear wheel speed that is uncorrected.

* * * * *